(12) United States Patent
Andersson

(10) Patent No.: US 8,757,917 B2
(45) Date of Patent: Jun. 24, 2014

(54) ASSEMBLY BETWEEN A SIDE MEMBER AND A REAR PANEL OF A PIECE OF FURNITURE

(76) Inventor: Benny Andersson, Älmhult (SE)

( * ) Notice: Subject to any disclaimer, the term of this patent is extended or adjusted under 35 U.S.C. 154(b) by 613 days.

(21) Appl. No.: 11/921,208

(22) PCT Filed: May 24, 2006

(86) PCT No.: PCT/IB2006/001360
§ 371 (c)(1),
(2), (4) Date: Nov. 26, 2007

(87) PCT Pub. No.: WO2006/126071
PCT Pub. Date: Nov. 30, 2006

(65) Prior Publication Data
US 2009/0129859 A1    May 21, 2009

(30) Foreign Application Priority Data
May 27, 2005  (DK) ............................. PA 2005 00773

(51) Int. Cl.
*F16B 7/08*    (2006.01)
*F16B 12/12*    (2006.01)
(52) U.S. Cl.
CPC ................................. *F16B 12/125* (2013.01)
USPC ............ 403/252; 403/253; 403/381; 403/401
(58) Field of Classification Search
CPC ............................. F16B 12/125; F16B 12/02
USPC .......... 403/331, 230, 252, 253–255, 264, 295, 403/339, 364, 382, 387, 401, 403, 381
See application file for complete search history.

(56) References Cited

U.S. PATENT DOCUMENTS

| | | | | | |
|---|---|---|---|---|---|
| 3,784,273 | A | * | 1/1974 | Nikolai | 312/265.3 |
| 4,015,716 | A | * | 4/1977 | Nichols | 205/521 |
| 5,333,429 | A | * | 8/1994 | Cretti | 52/309.7 |
| 5,419,264 | A | * | 5/1995 | Davis | 108/27 |
| 5,499,886 | A | * | 3/1996 | Short et al. | 403/381 |
| 5,580,636 | A | * | 12/1996 | Kampmann et al. | 428/119 |
| 5,599,082 | A | * | 2/1997 | Mlakar et al. | 312/409 |
| 6,041,562 | A | * | 3/2000 | Martella et al. | 52/236.7 |
| 6,138,420 | A | * | 10/2000 | Fyfe | 52/262 |

(Continued)

FOREIGN PATENT DOCUMENTS

DE    19823537    2/1999
DE    202004019882    4/2006

*Primary Examiner* — Victor MacArthur
(74) *Attorney, Agent, or Firm* — Cooper & Dunham LLP

(57) ABSTRACT

An assembly (1) between a side member (2) and a rear panel (3), for instance in a piece of furniture, a wardrobe or a kitchen element. The assembly consists of a flange part (3*a*) of the rear panel (3) inserted sidewards into a locking slot (6*a*) in the side member (2), the insertion of the flange part (3*a*) being effected via a longitudinal slot (8) at the access to the locking slot (6). The rear panel (3) is secured to the side member (2) by at least one part (10) of the side member (2) extending into at least one withdrawal slot (20) in the rear panel (3), or by at least a part (21) of the rear panel extending into at least one withdrawal slot (23) in the side member (2). Hereby an assembly is obtained which is not only light of weight, but which is also solid and robust and easy to set up.

8 Claims, 2 Drawing Sheets

(56) References Cited

U.S. PATENT DOCUMENTS

| | | | |
|---|---|---|---|
| 6,253,507 B1 * | 7/2001 | Martino | 52/211 |
| 6,283,668 B1 * | 9/2001 | Norek | 403/231 |
| 6,413,007 B1 * | 7/2002 | Lambright | 403/353 |
| 6,575,541 B1 * | 6/2003 | Hedrick et al. | 312/223.1 |
| 2005/0229531 A1 | 10/2005 | Green et al. | |

* cited by examiner

ASSEMBLY BETWEEN A SIDE MEMBER AND A REAR PANEL OF A PIECE OF FURNITURE

TECHNICAL FIELD

The invention relates to an assembly between a side member and a rear panel of a piece of furniture.

BACKGROUND ART

The German published specification No. 198 23 537 A1 discloses a set of shelves built up from very thin walls of plate material. Thus the individual side member consists of one thin plate only and the latter is fastened to a rear plate of the set of shelves by means of relatively small tongues on the plates of the side members, said tongues being slid into the grooves in the rear panel. As each wall of the set of shelves consists of only one layer of plates, said set of shelves has only low carrying capacity. The set of shelves is relatively light, but it is not as stable and strong as desirable.

DISCLOSURE OF INVENTION

The object of the invention is to provide an assembly between a side member and a rear panel of a piece of furniture, and which is not only of relatively light weight but which is also stable and strong and easy to set up.

The assembly according to the invention is characterised in that it consists of a flange part of the rear panel inserted sidewards into the locking slot of the side member, the insertion being effected via a longitudinal groove at the access to the locking slot, and the rear panel being secured to the side member by at least one part of the side member extending into at least one withdrawal slot in the rear panel or at least one part of the rear panel extending into at least one withdrawal slot in the side member. Hereby an assembly is obtained which is not only of light weight, but which is also stable and strong and easy to set up.

According to the invention the locking slot of the side member—seen from a horizontal sectional view—may substantially have the shape of a trapeze, and the flange part of the rear panel may have at least one tilted edge face with the same inclination or substantially the same inclination as a tilted wall in said trapeze, and the tilted edge face of the rear panel may abut said tilted wall. Thereby an increased stability of the assembly is obtained.

Furthermore, if the side member is made of a laminate consisting of a central interlayer and a panel plate at each side of the interlayer, according to the invention the locking slot, into which the rear panel is inserted, may be placed off said interlayer, where at least one edge part of said receiving slot may be inserted in a longitudinal groove in the flange part of the rear panel. Hereby an additional stabilisation of the flange part of the rear panel is obtained in relation to the side member.

Moreover, according to the invention the rear panel may have a longitudinal projection at at least a part of its width, said longitudinal projection being adapted to interact with a longitudinal withdrawal slot at the edge area of one of the panel plates. Also hereby the assembly is stiffened.

Furthermore, according to the invention, the interlayer of the side member may be of light weight material such as cellular material with a thickness of 15-50 mm while the panel plates may for instance be of chipboard or massive bond plate and have a thickness of 15-22 mm. Hereby it is achieved that the assembly provides a considerable stability without being particularly heavy.

Besides, according to the invention the interlayer of said side member may be built up from thin HDF (high density fibreboard), MDF (medium density fibreboard), hardboard or thin, preferably approx. 2.5 mm thick, massive bond plate. Thereby an especially stable assembly is obtained.

Furthermore, according to the invention a strip of chipboard or massive wood may be provided at the outer edge of the interlayer, and at the centre of the interlayer a "Honeycomb" cell-like construction of pulpwood fibres, preferably of Liner quality may be provided. This embodiment has shown to be particularly strong in relation to the weight of the material.

The invention also relates to a piece of furniture such as a set of shelves, a wardrobe or a kitchen element, and which at least consists of two side members and a rear plate as well as possibly one or more shelves placed on top of each other, said piece of furniture being characterised in that at least one of the assemblies between the side members and the rear plate is adapted according to one or more of claims 1-7. Hereby it is achieved that the piece of furniture gains a sound cohesion without this implying that the piece of furniture becomes much heavier.

BRIEF DESCRIPTION OF THE DRAWINGS

The invention is explained in detail below with reference to the drawings, in which.

BEST MODES FOR CARRYING OUT THE INVENTION

Figure 1:
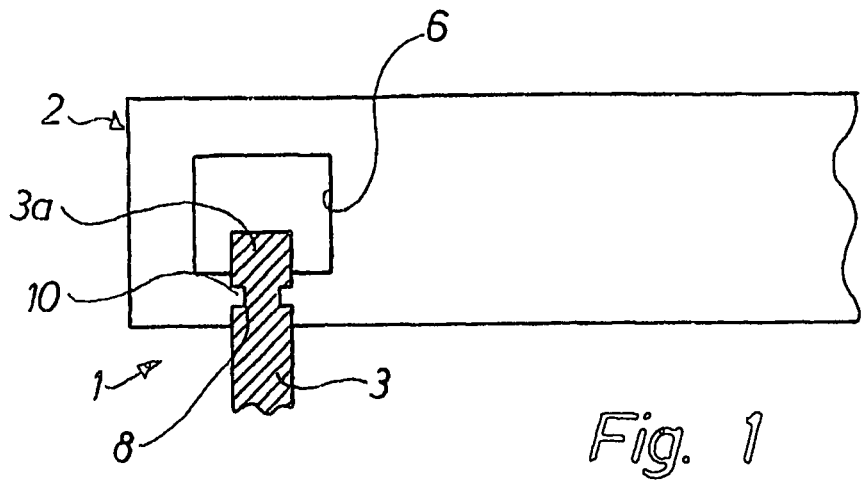
FIG. 1 shows—from a sectional view along the plane V-V in FIG. 5—a first embodiment of the assembly according to the invention as an assembly between a rear panel and a side member is shown.
Figure 5:
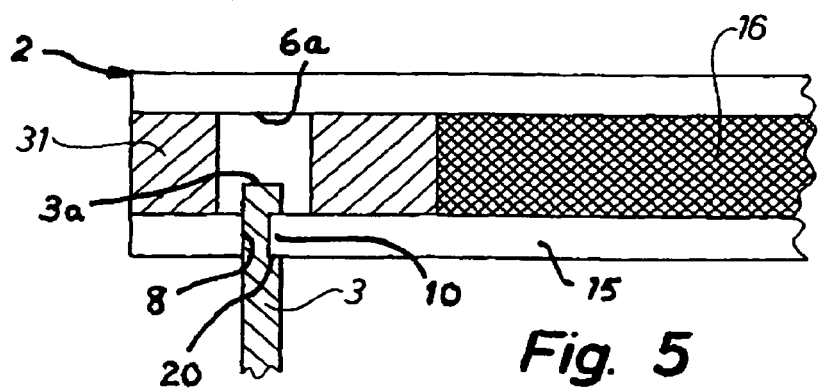

The assembly 1 shown in FIG. 1, said assembly being an assembly between a side member 2 and a rear panel 3 in a piece of furniture, e.g. the set of shelves shown in FIG. 5, consists of a flange part 3a of the rear panel 3 inserted sidewards into the locking slot 6 in the side member 2. The insertion of the rear panel in the side member 2 is effected via a longitudinal groove 8 at the access to said locking slot 6. The rear panel 3 is secured to the side member 2 by at least a part 10 of said side member extending into a withdrawal slot 8 in the rear panel 3. Something similar applies at the other side of the rear panel 3.

Figure 2:
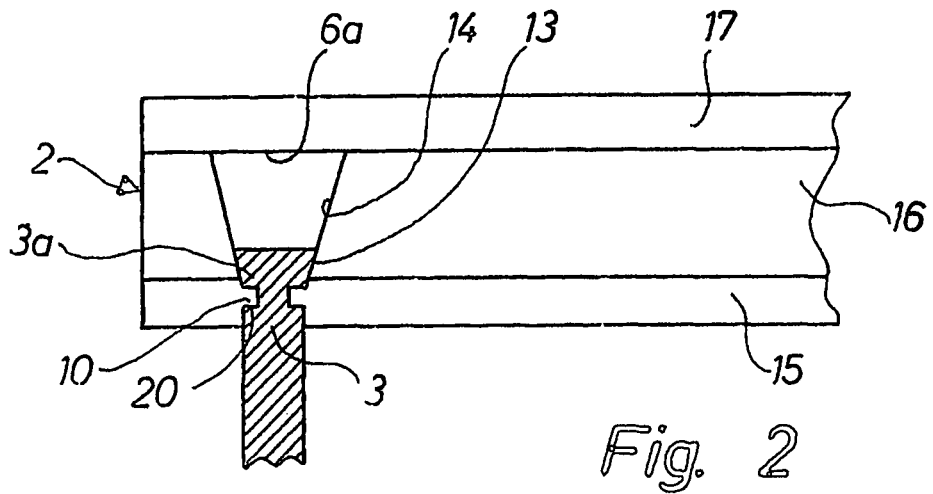
FIG. 2—from a sectional corresponding to FIG. 1—a second embodiment of the assembly, where the part of the rear panel extending furthest into the locking slot in the side member has tilted walls, FIG. 3—from a sectional corresponding to FIG. 1—a third embodiment of the assembly according to the invention, the rear panel having two projections, each of said projections cooperating with their respective withdrawal slot in the side member, FIG. 4—from a sectional corresponding to FIG. 1—a fourth embodiment of the assembly according to the invention, where a projection on the side member at the left side of the assembly extends into a withdrawal slot in the rear panel, and where a projecting part on the rear panel at the right side of the assembly interacts with a withdrawal slot in the side member, FIG. 5—from a sectional corresponding to FIG. 1—a fifth embodiment of an assembly according to the invention, where the interlayer 16 is built up from materials with various structures.

As shown in FIG. 2, the locking slot 6a of the side member 2 may substantially have the shape of a trapeze, just as the flange part 3a of the rear panel may have at least one tilted edge face 13 with substantially the same inclination as the tilted wall 14 in said trapeze. The tilted edge part 13 of the rear panel may abut the tilted wall 14 of the locking slot 6a.

FIG. 2 shows how the side member 2 may consist a laminate built up of a central interlayer 16, and a first panel plate 15 and a second panel plate 17 placed at each side of the interlayer 16. As it can be seen, the locking slot 6a, into which the flange part 3a of the rear panel 3 is inserted, may be placed substantially off said interlayer 16. At least the one edge part 10 at said receiving slot 8 may be inserted in a longitudinal groove 20 in the flange part 3a of the rear panel 3.

Figure 3:
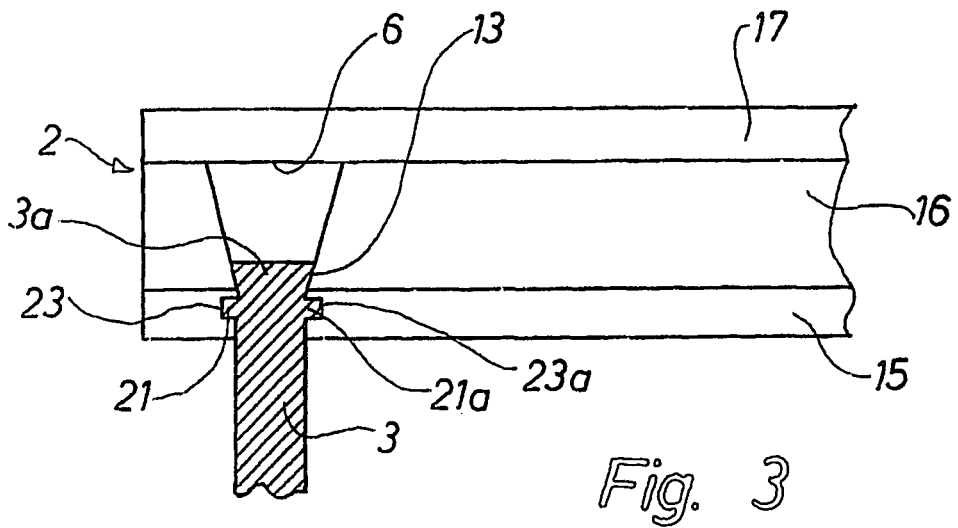

Instead of one or more longitudinal grooves 20 being placed in the rear panel 3, a projection 21, possibly two projections 21 and 21a extending to the edge close to the rear Plate—see FIG. 3—may be formed, and said longitudinal projection may be adapted to interact with a longitudinal withdrawal slot 23—possibly withdrawal slots 23 and 23a—at the edge area of the first panel plate 15.

The central interlayer 16 of the side member 2 may be of light weight material, for instance cellular material, and have a thickness of 15-50 mm. The panel plates 15 and 17 may for instance be built up of chipboard or massive bond plate. Each panel plate 15, 17 may have a thickness of 15-22 mm.

The light weight material in the interlayer 16 of the side member may be built up from thin HDF (High density fibreboard), MDF (Medium density fibreboard), hardboard or a thin, preferably approx. 2.5 mm thick, massive bond plate.

Figure 4:
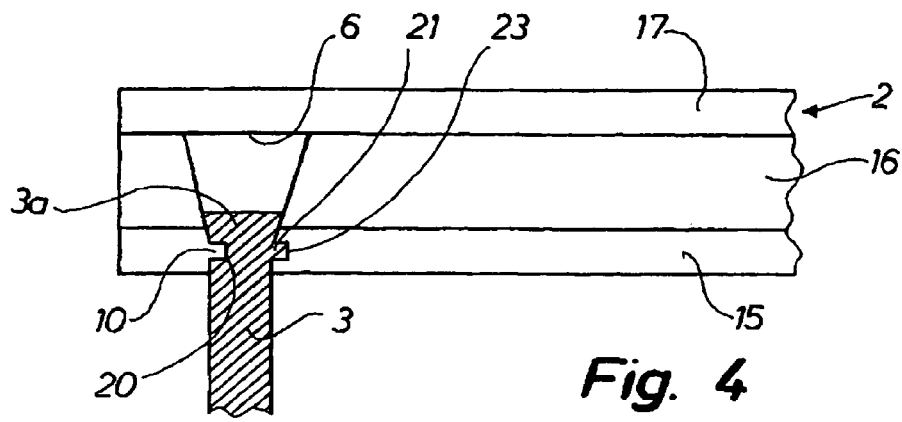

As shown in FIG. 4 the assembly between the rear panel 3 and the side member 2 may be provided in that for instance the right side of the rear panel 3 may have a projection 21 extending into a withdrawal slot 23 in the panel plate 15 while at the left side of the assembly, a projection 10 is placed on the panel plate 15, said projection extending into a longitudinal groove 20 in the rear panel 3.

As shown in FIG. 5 a list 31 from chipboard or massive wood may be placed at the outer areas of the interlayer 16, and a "honeycomb" cell-like layer construction from celluloid fibre may be provided at the centre of the interlayer 16. Said construction is preferably of Liner quality.

The assembly according to the invention is particularly well adapted for the use in sets of shelves, wardrobes or kitchen elements at least consisting of two side members and a rear panel as well as one or more shelves placed on top of each other. The assembly according to the invention is included in at least one of the assemblies between the side members and the rear panel.

As it appears the invention especially relates to the locking function between the rear panel and the side members in a piece of case furniture.

Specifically, the assembly according to the invention can be set up by providing a single groove 20 at one side of the rear panel 3—said groove being approx. 1.5 mm±0.2 mm deep and 3.2+0.2 mm wide; alternatively a groove 20 can be provided at each side of the rear panel 3, said grooves being approx. 1.0±0.2 mm deep and 3.2±0.2 mm wide. The grooves are provided lengthwise along the rear panel 3, for instance 2.0 mm from the edge of the rear panel.

The object of having grooves 20 at each side of the rear panel 3 (see FIG. 1) is to make it possible that said rear panel may be turned 180°. If for instance both sides of the rear panel 3—possibly just the one side hereof—are provided with a pattern (e.g. a birch pattern on one side and a uniform white colour on the other side)—a customer will have an additional option with regard to the design of the piece of furniture.

Provided that there are grooves 20 at both sides of the rear panel 3, the finished piece of furniture is more stable than if there is only one groove 20 in said rear panel.

Figure 6:
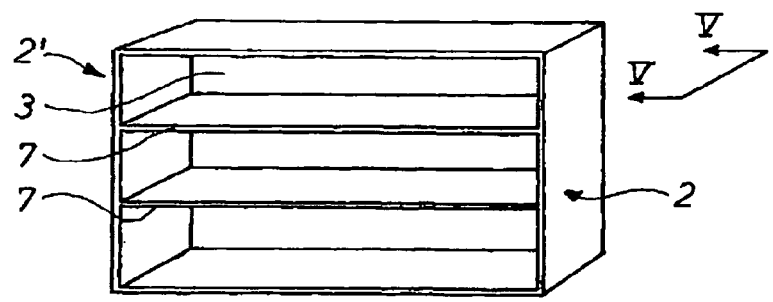
FIG. 6 shows a perspective and schematic view of a completed set of shelves including one or more assemblies according to the invention, clearly showing the cutting plane V-V.

On manufacturing a piece of furniture according to the invention, e.g. a set of shelves, the perpendicular locking slots 6 (see FIG. 2) are manufactured at the right side member 2 and the left side member 2' (see FIG. 6) of the set of shelves in such a way that the rear panel 3 may be inserted sidewards in the slot 6 of the side members by means of the longitudinal grooves 20 of the rear panel; said sidewards movement corresponds in FIGS. 1-5 to a movement of the rear panel 3 perpendicular to the plane of the paper.

The invention can be changed in many ways without deviating from the idea behind it.

The invention claimed is:

1. An assembly between a side member and a rear panel of a piece of furniture wherein the assembly comprises a flange part of the rear panel slidably releasably inserted sidewards into a locking slot in the side member, the insertion being effected by a longitudinal groove at an access to the locking slot, and the rear panel being secured to the side member by at least one part of the side member extending into at least one withdrawal slot in the rear panel, wherein the side member is made of a laminate comprising a central interlayer and a panel plate at each side of the interlayer, and wherein the locking slot in the side member, into which the flange part of the rear panel is inserted, at least is placed off said interlayer, and at least one edge part of one panel plate of the side member is inserted in a longitudinal groove in the flange part of the rear panel.

2. The assembly according to claim 1, wherein said interlayer comprises a cellular material with a thickness of 15-50 mm, while the panel plates are of at least one of chipboard and massive bond plate and each have a thickness of 15-22 mm.

3. The assembly according to claim 2, wherein the lightweight material in the interlayer of the side member is at least one of thin high density fibreboard and medium density fibreboard, hardboard and an approximately 2.5 mm thick, massive bond plate.

4. The assembly according to claim 2, wherein a list of chip-board or massive wood is placed at the outer areas of the interlayer, and wherein a honeycomb construction from celluloid fibre is placed at the center of the interlayer.

5. A piece of furniture, including at least one of a set of shelves, a wardrobe and a kitchen cabinet, and which comprises two side members and a rear panel as well as one or more shelves placed on top of each other, wherein at least one of an assembly between the side members and the rear panel is shaped as the assembly according to claim 2.

6. The assembly according to claim 1, wherein a list of at least one of chipboard and massive wood is placed at outer areas of the interlayer, and a construction from celluloid fibre is placed at a centre of the interlayer.

7. A piece of furniture, including at least one of a set of shelves, a wardrobe and a kitchen cabinet, and which comprises two side members and a rear panel as well as one or more shelves placed on top of each other, wherein at least one of an assembly between the side members and the rear panel is shaped as the assembly according to claim 6.

8. A piece of furniture, including at least one of a set of shelves, a wardrobe and a kitchen cabinet, comprising two side members and a rear panel as well as one or more shelves placed on top of each other, wherein at least one of an assembly between the side members and the rear panel is shaped as the assembly according to claim 1.

\* \* \* \* \*